United States Patent
Towler et al.

(10) Patent No.: US 7,192,562 B1
(45) Date of Patent: *Mar. 20, 2007

(54) HYDROGEN-OXYGEN MIXER-SPARGER

(75) Inventors: Gavin P. Towler, Barrington, IL (US); Kurt M. Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 529 days.

This patent is subject to a terminal disclaimer.

(21) Appl. No.: 10/418,589

(22) Filed: Apr. 17, 2003

(51) Int. Cl.
*B01J 8/00* (2006.01)
*B01J 19/26* (2006.01)

(52) U.S. Cl. .............. 422/211; 422/189; 422/190; 422/192; 422/218; 422/220; 422/224; 422/231

(58) Field of Classification Search .......... 422/218, 422/213, 214; 366/341, DIG. 1, DIG. 2, 366/DIG. 3; 239/555, 568
See application file for complete search history.

(56) References Cited

U.S. PATENT DOCUMENTS

| 4,336,240 A | 6/1982 | Moseley et al. ......... 423/584 |
|---|---|---|
| 4,347,231 A | 8/1982 | Michaelson ............ 423/584 |
| 4,832,938 A | 5/1989 | Gosser et al. ........... 423/584 |
| 5,925,588 A | 7/1999 | Chuang et al. .......... 502/181 |
| 6,042,804 A | 3/2000 | Huckins ................ 423/584 |
| 7,014,835 B2 * | 3/2006 | Mathias et al. .......... 423/652 |
| 2003/0039169 A1 * | 2/2003 | Ehrfeld et al. .......... 366/336 |

FOREIGN PATENT DOCUMENTS

WO   WO 01/43857 A1 *   6/2001
WO   WO 02/089966 A2 *  11/2002

* cited by examiner

*Primary Examiner*—Glenn A. Caldarola
*Assistant Examiner*—Jennifer A. Leung
(74) *Attorney, Agent, or Firm*—Frank S. Molinaro; Arthur E. Gooding

(57) ABSTRACT

An apparatus is disclosed for the generation of hydrogen peroxide. The apparatus provides for the production of a large scale volume of hydrogen peroxide by the generation of a liquid bearing bubble cloud. The bubbles are generated with a tiny volume before flowing over the reactor bed to generate the hydrogen peroxide.

20 Claims, 9 Drawing Sheets

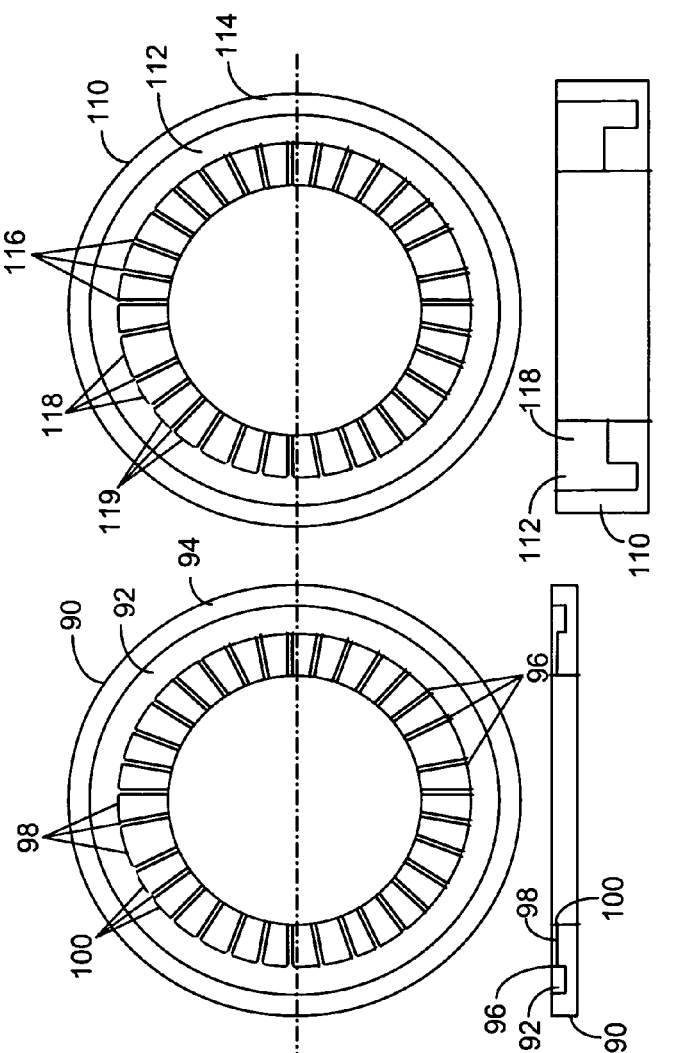

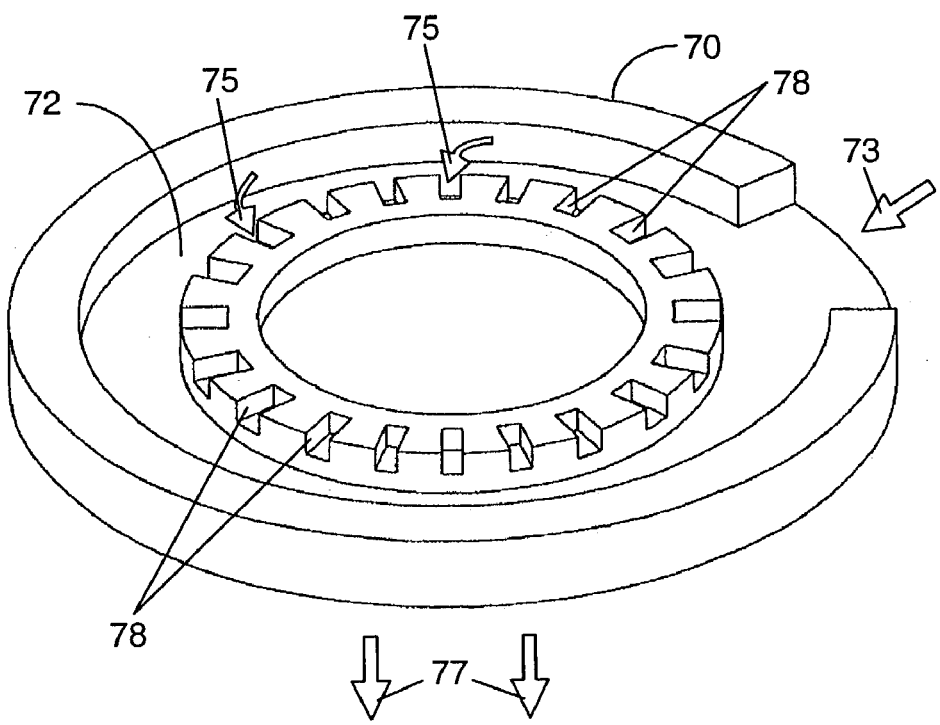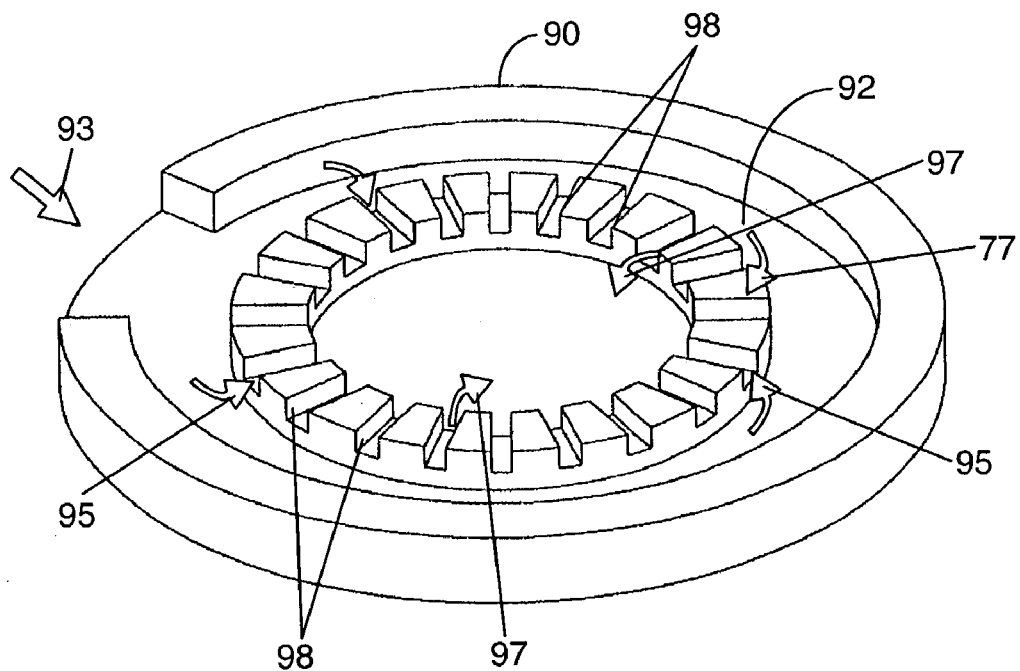
FIG. 8

HYDROGEN-OXYGEN MIXER-SPARGER

FIELD OF THE INVENTION

This invention relates to the production of hydrogen peroxide, and more specifically, it relates to the large scale production of hydrogen peroxide.

BACKGROUND OF THE INVENTION

Currently the most widely practiced industrial scale production method for hydrogen peroxide is an indirect reaction of hydrogen and oxygen employing alkylanthraquinone as the working material. In a first catalytic hydrogenation step, the alkylanthraquinone, dissolved in a working solution comprising organic solvents (e.g. di-isobutylcarbinol and methyl naphthalene), is converted to alkylanthrahydroquinone. In a separate autooxidation step, this reduced compound is oxidized to regenerate the alkylanthraquinone and yield hydrogen peroxide. Subsequent separation by aqueous extraction, refining, and concentration operations are then employed to give a merchant grade product.

Overall, this indirect route to $H_2O_2$ formation, whereby a carrier medium is reduced and then oxidized, adds complexity and requires high installation and operating costs. One notable drawback is the significant solubility of the alkylanthraquinone in the aqueous extraction medium used to separate the hydrogen peroxide product. This promotes loss of working solution and leads to contamination of the hydrogen peroxide product with organic species that, when the hydrogen peroxide is concentrated to levels suitable for transport, are reactive with it. A second problem relates to the solubility of the aqueous extraction solution in the alkylanthraquinone working solution. When wet working solution is separated from the aqueous phase for recycle to the indirect oxidation stage, residual aqueous phase "pockets" within the organic solution provide regions for hydrogen peroxide product to concentrate to the extent of becoming hazardous. A third problem relates to the usage and recovery of an organic compound when small amounts of hydrogen peroxide are needed without the organic contamination in an aqueous stream.

Considerably more simple and economical than the alkylanthraquinone route is the direct synthesis of hydrogen peroxide from gaseous hydrogen and oxygen feed streams. This process is disclosed in U.S. Pat. No. 4,832,938 B1 and other references, but attempts at commercialization have led to industrial accidents resulting from the inherent explosion hazards of this process. Namely, explosive concentrations of hydrogen in an oxygen-hydrogen gaseous mixture at normal temperature and pressure are from 4.7–93.9% by volume. Thus the range is extremely broad.

It is also known that dilution of the gaseous mixture with an inert gas like nitrogen scarcely changes the lower limit concentrations, on an inert gas-free basis, of the two gases. Within normal ranges of pressure variation (1–200 atmospheres) and temperature variation (0–100° C.) the explosive range is known to undergo little change. Furthermore, even when these reactants are brought together in a ratio that, in the homogeneous condition, would be outside the flammability envelope, the establishment of homogeneity from pure components necessarily involves at least a temporary passage through the flammability envelope. For these reasons, the explosion risks associated with the direct contacting of hydrogen and oxygen are not easily mitigated.

In the area of directly contacting hydrogen and oxygen, some efforts have also been made to contain the reaction in a liquid phase. For example, U.S. Pat. No. 5,925,588 B1 discloses the use of a catalyst having a modified hydrophobic/hydrophilic support to provide optimum performance in an aqueous liquid phase. Also, U.S. Pat. No. 6,042,804 B1 discloses dispersing minute bubbles of hydrogen and oxygen into a rapidly flowing acidic aqueous liquid medium containing a catalyst. Unfortunately, however, the hydrogen and oxygen reactants are only slightly soluble in the aqueous reaction solvents disclosed in these references.

Other references, namely U.S. Pat. No. 4,336,240 B1 and U.S. Pat. No. 4,347,231 B1 disclose two-phase reaction systems with a homogeneous catalyst dissolved in an organic phase. As mentioned in the former of these two references, homogeneous catalyst systems in general suffer from drawbacks that are a deterrent to their commercial use. The adverse characteristics include poor catalyst stability under reaction conditions, limited catalyst solubility in the reaction medium, and low reaction rates for the production of hydrogen peroxide. In addition, a gaseous $H_2/O_2$ containing environment above the two-phase liquid reaction system maintains the equilibrium concentrations of these reactants dissolved in the liquid phase. Therefore, this gaseous atmosphere above the reaction liquid must necessarily be outside the flammability envelope, thus greatly restricting the range of potential reactant mole ratios in the liquid phase.

There are two types of reactors for making hydrogen peroxide in water. The first is a slurry reactor in which the gas bubbles and catalyst are dispersed in a flowing liquid phase. While this is advantageous for mixing and provides good heat and mass transfer, this method requires a large amount of expensive catalyst, in addition to catalyst recovery and recycle methods. The second reactor is a trickle bed reactor in which the gas and liquid flow over a packed bed of catalyst. The main drawback to the trickle bed reactor is the gas is a continuous phase and therefore requires a small channel size, and hence small particle size to prevent the hydrogen and oxygen from entering a dangerous regime.

It would be useful to have a device and process for making large quantities of hydrogen peroxide, on an as-needed basis, without the need of extra chemicals for an environmental safer method, and without generating a waste product stream.

SUMMARY OF THE INVENTION

One method to overcome the drawbacks of the current methods of hydrogen peroxide production is to generate a large amount of hydrogen and oxygen gas mixture in a dispersed phase of small bubbles in a liquid. The present invention provides an apparatus for generating a mixture of hydrogen and oxygen as tiny gas bubbles. The present invention comprises a pair of plates where the first plate has a main channel and a plurality of smaller channels defined in the first plate for carrying a first gas, and the second plate has a main channel and a plurality of smaller channels defined in the second plate for carrying a second gas. The plates when stacked provide for mixing of the first and second gas streams in the smaller channels of the second plate, and where the gas mixture exits as small bubbles into a liquid stream.

In another embodiment, the apparatus includes a cooling plate that also provides the liquid stream for bearing the gas bubbles exiting the smaller channels. The cooling plate is stacked with the first and second gas distribution plates in a repeating manner of first plate, second plate, cooling plate.

In yet another embodiment, the apparatus comprises a reactor for generating hydrogen peroxide from the liquid and gas bubbles containing hydrogen and oxygen. The design is such that the liquid bearing a gas bubble cloud flows over the reactor and where the gas bubble cloud is not allowed to agglomerate into larger gas bubbles, providing for a safe operation of the reactor.

Other objects, advantages and applications of the present invention will become apparent to those skilled in the art from the following detailed description and figures. Additional objects, embodiments and details of this invention can be obtained from the following detailed description of the invention.

BRIEF DESCRIPTION OF THE DRAWINGS

FIGS. 6A and B is a design of a first plate for the mixer with an annular configuration, where 6A is a top view and 6B is a cross-sectional view;

FIGS. 7A and B is a design of a second plate for the mixer with an annular configuration, where 7A is a top view and 7B is a cross-sectional view;

FIG. 8 is a schematic of the first and second plates, and flow through the plates of the mixer;

FIGS. 9A and B is a design of a cooling plate for the mixer with an annular configuration, where 9A is a top view and 9B is a cross-sectional view;

DETAILED DESCRIPTION OF THE INVENTION

The present invention comprises an apparatus for large scale mixing of hydrogen and oxygen in water for reaction to generate hydrogen peroxide ($H_2O_2$). A problem with scale up of hydrogen peroxide production is the generation of quantities that will create large volumes of a mixture of hydrogen and oxygen. This is a potentially dangerous situation. It is therefore desirable to generate a large quantity of mixed hydrogen and oxygen, but in a dispersed phase of small bubbles in water for the rapid dissolution in water and reaction to produce hydrogen peroxide. A new design of a mixer suitable for large scale use is presented.

Figure 1:
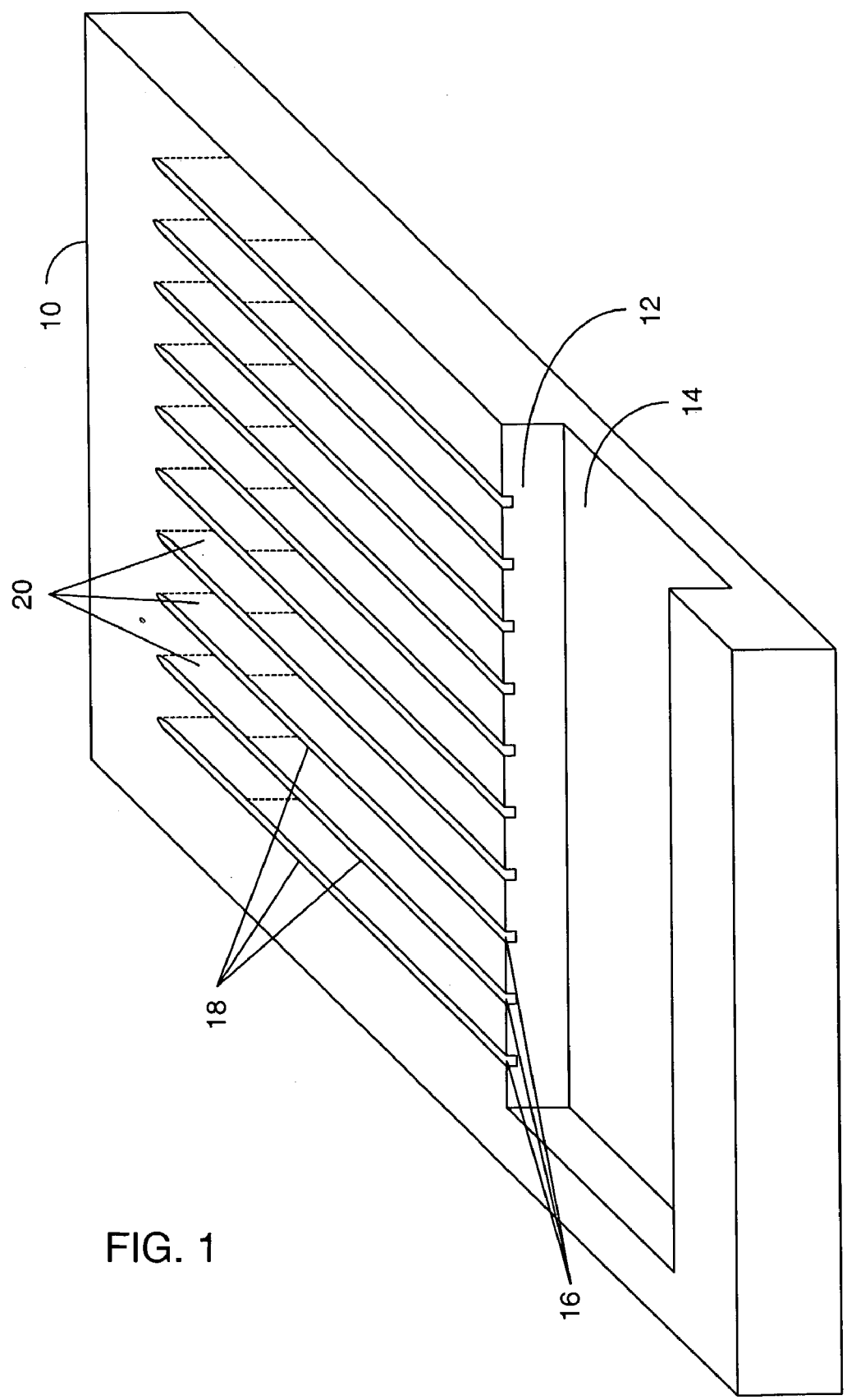
FIG. 1 is a design of a first plate for the mixer.

In one embodiment, the apparatus comprises an array of plates, where each plate has channels formed into the plate, and the plates are joined together. Means for forming channels include, but are not limited to, etching, pressing, stamping and milling and are well known in the art. Means for joining the plates together are well known in the art, and include, but are not limited to, methods using diffusion bonding, brazing, and welding. Preferably, the array is of pairs of plates, where the plates are stacked in an alternating sequence. As shown in FIG. 1, the first plate 10 of a pair of plates has a first side, an opposing side, and first, second, third, and fourth edges. The plate 10 has a main channel 12 having an inlet 14, and a plurality of outlets 16 on one side of the plate 10. The main channel is etched, pressed, stamped, or milled into the plate without going through the plate 10. The first plate 10 further has a plurality of smaller channels 18 on the same side of the plate 10 as the main channel 12, where each smaller channel 18 has an inlet in fluid communication with a corresponding outlet 16 from the main channel 12. The smaller channels 18 each have an outlet 20 that extends through the plate 10 to the opposing side, creating an array of slits on the opposing side of the plate. In this particular embodiment, the smaller channels 18 do not extend to an edge of the plate 10, though in other embodiments the channels can extend to an edge of the plate 10.

Figure 2:
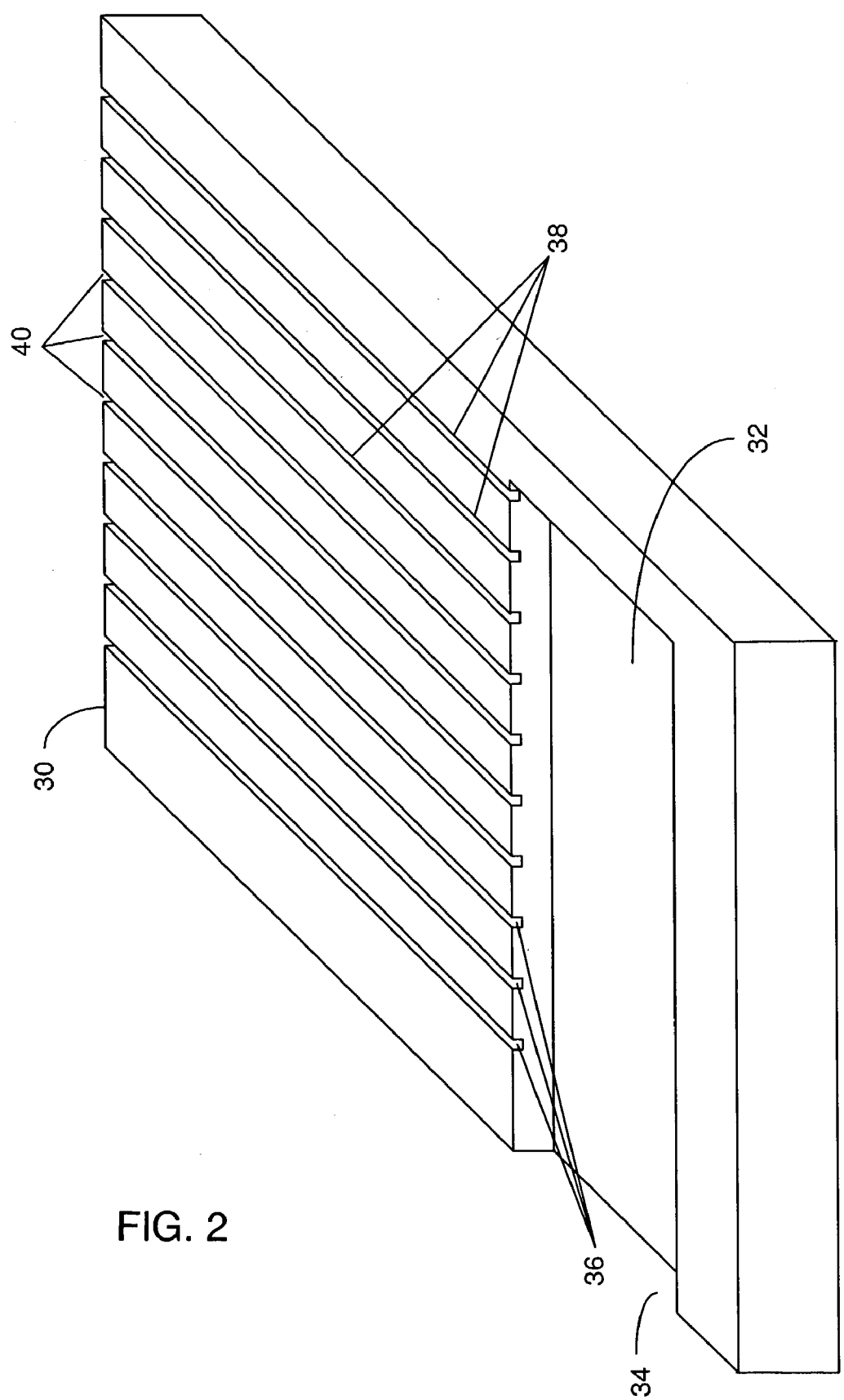
FIG. 2 is a design of a second plate for the mixer.

The embodiment further comprises a second plate 30 of a pair of plates, as shown in FIG. 2, and having a first side, an opposing side, and first, second, third, and fourth edges. The plate 30 has a main channel 32 having an inlet 34, and a plurality of outlets 36 on one side of the plate 30. The main channel is etched, pressed, stamped, or milled into the plate without going through the plate 30. The second plate 30 further has a plurality of smaller channels 38 on the same side of the plate 30 as the main channel 32, where each smaller channel 38 has an inlet in fluid communication with a corresponding outlet 36 from the main channel 32. The smaller channels 38 each have an outlet 40 which opens at one edge of the second plate 30. As with the main channel 32, the smaller channels 38 do not extend through the plate 30 to the opposing side.

The two plates 10, 30 each have the same number of smaller channels 18, 38, and each channel 18 has a corresponding channel 38. When the plates 10, 30 are stacked, the corresponding smaller channels 18, 38 are aligned such that the outlet 20 of the smaller channel 18 of the first plate is in fluid communication with the corresponding channel 38 of the second plate. The first plate smaller channels 18 have an outlet 20 that terminates into the second plate smaller channels 38. The section of the second plate smaller channels 38 downstream of the outlet 20 of the first plate smaller channels 18 provides a region for gases coming from the two channels 18, 38 to mix. The length of this section in the second smaller channels 38 is chosen to achieve good mixing of the gases prior to the gas mixture leaving the second plate smaller channel outlet 40.

When a plurality of pairs of plates 10, 30 are stacked and affixed together, the resulting embodiment will have a rectangular prismatic shape with 6 sides, forming a sparger. On one side there will be the inlets for the main channels 12 for the first plates, on a second side, opposite the first side, there will be the inlets for the main channels 32 for the second plates, and on a third side there will be an array of small openings that are the outlets 40 for the smaller channels 38 of the second plates. This provides for good mixing of gases entering the main channels 12, 32 and exiting as a mixture from the smaller channel outlets 40. With a liquid flowing over the smaller channel outlets 40, a cloud of gas bubbles is entrained in the liquid providing an improved mass transfer for dissolving the gas mixture in the liquid.

Figure 3:
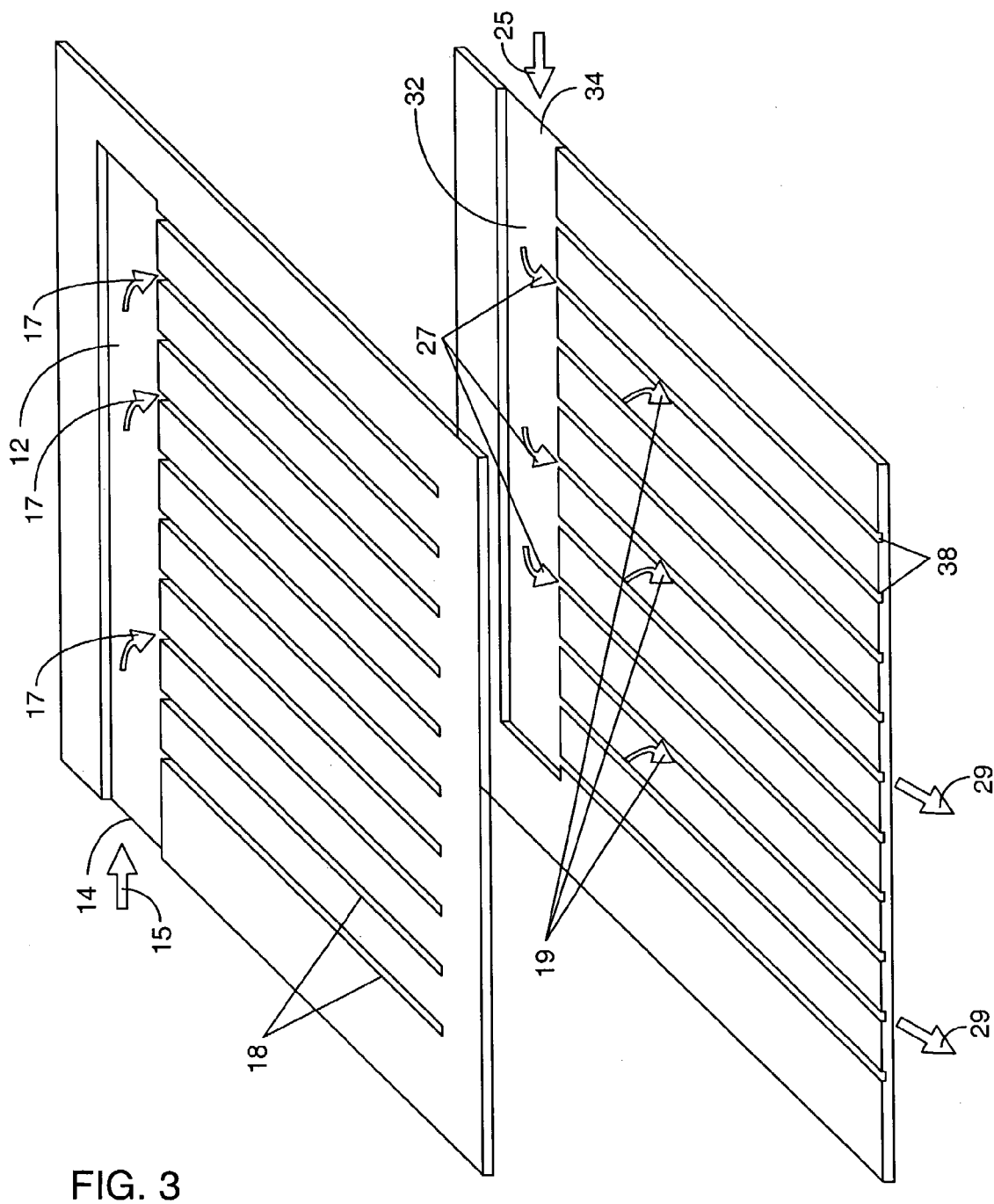
FIG. 3 is a schematic of the first and second plates, and flow through the plates of the mixer.

A schematic showing the mixing of two gases with the present invention is shown in FIG. 3. A first gas flows into the first plate main channel 12 depicted by arrow 15. The first gas then distributes and flows into the secondary channels 18 depicted by arrows 17. The first gas exits the first plate secondary channels 18 and flows into the second plate secondary channels depicted by arrows 19. A second gas flows into the second plate main channel 32 depicted by arrow 25. The second gas then distributes and flows into the secondary channels 38 depicted by arrows 27. The second gas mixes with the first gas flowing depicted by arrows 19 into the second plate secondary channels 38. The mixture of the first gas and second gas exit the second plate secondary channels 38 depicted by arrows 29.

In the present embodiment, the main channels 12, 32 are sized to a width of approximately 50 mm and a depth of approximately 0.5 mm, providing a cross sectional area of 25 mm². The smaller channels 18, 38 are sized to a width of approximately 0.2 mm and a depth of approximately 0.2 mm, providing a cross sectional area of 0.04 mm². A good distribution of the gas from the main channels to the smaller channels is achieved by maintaining a ratio of the cross sectional area of the main channel to the sum of cross sectional areas of the smaller channels to be at least 3. In the present embodiment, the current channel sizes allow for about 208 smaller channels to each main channel. The use of small channel dimensions for the smaller channels provides lamellar mixing of the gases and has been shown to be a safe and effective way of mixing hydrogen and oxygen without combustion.

While the specific design of the smaller channels 18, 38 for this embodiment have an effective diameter of about 200 micrometers (0.2 mm), the channel shape and design of the smaller channels 18, 38 are only constrained based upon the composition of the gases to be mixed by the sparger. In the instant case of the mixing of hydrogen and oxygen, the smaller channels 18, 38 have an effective diameter from about 50 micrometers (0.05 mm) to about 300 micrometers (0.3 mm) and preferably no greater than about 200 micrometers (0.2 mm).

While the design of this invention is for use of mixing hydrogen and oxygen for the production of hydrogen peroxide, the invention is not limited to these gases, but to the contrary, any lamellar mixing of gases may be performed with this invention.

Figure 4:
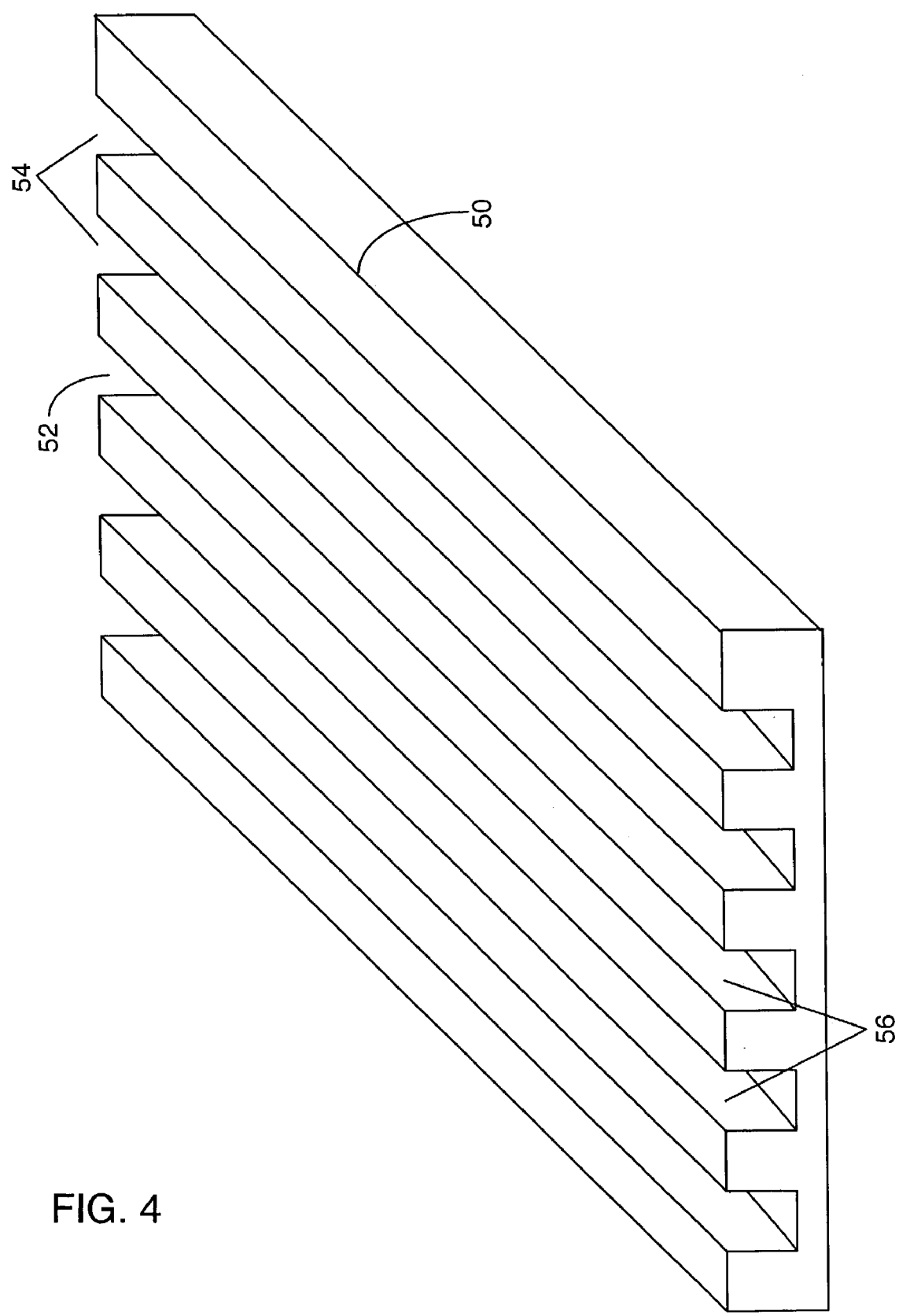
FIG. 4 is a design of a cooling plate for the mixer.

In another embodiment, the invention includes a cooling plate 50, as shown in FIG. 4. The cooling plate 50 also acts as a conduit for providing a liquid component in which the gas bubbles exiting the outlets 40 are entrained. The cooling plate 50 is designed to be nested with the first 10 and second 30 plates in an alternating sequence, i.e., first plate 10, second plate 30, cooling plate 50, first plate 10, second plate 30, cooling plate 50, etc.

Figure 5:
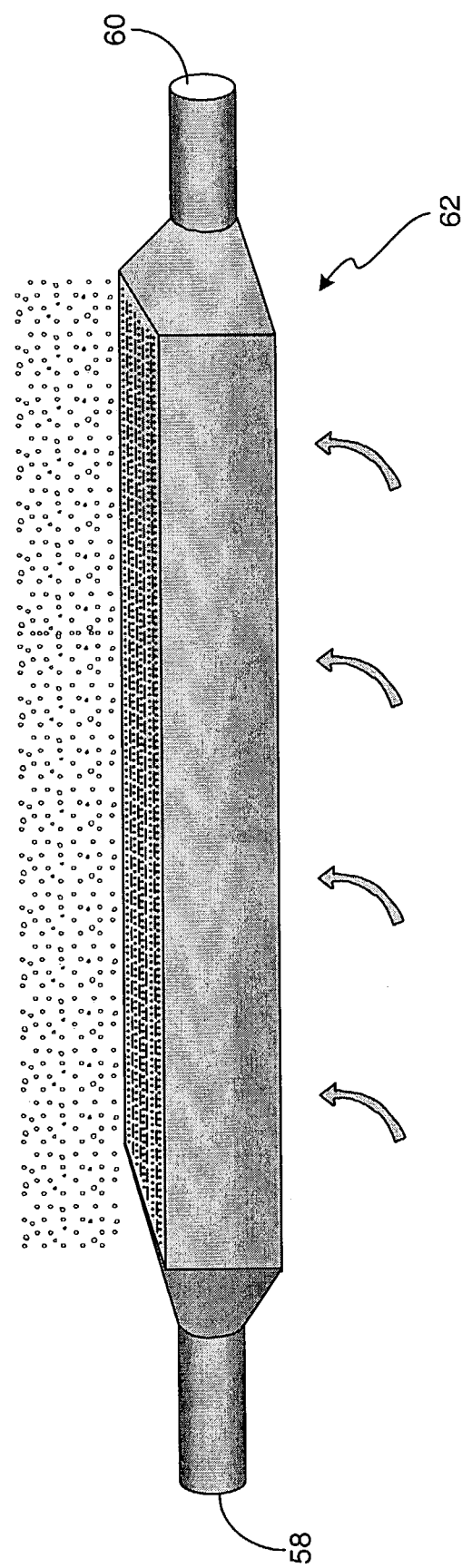
FIG. 5 is a diagram of the assembled sparger with gases and liquids flowing in the sparger.

The cooling plate 50 is designed with a series of parallel channels 52. The channels 52 are etched, stamped, pressed, milled or otherwise formed in the plate. The channels 52 have an inlet 54 and an outlet 56. When the plates are stacked, the outlets 56 of the cooling plates 50 are on the same side of the stacked structure as the second plate smaller channel outlets 40. A diagram of the assembled sparger 62 is shown in FIG. 5, showing the gas inlets 58, 60 and the gas outlets 40, with liquid flowing up through the cooling plate channels 52 generating a flow with dispersed gas bubbles. The gas inlets 58, 60 direct the individual gases to the corresponding main channel inlets 14, 34 of the plates 10, 30. The cooling plate 50 allows for a third component, and in this particular case a liquid. Liquids useable in the present invention include water, methanol, alcohols, and mixtures thereof. A preferred liquid is water. The cooling plate 50 can be designed (not shown) with smaller channels for carrying a third gaseous component with an appropriate manifold in fluid communication with the cooling channel inlets 54. A plurality of the spargers 62 may be used in either a parallel or series configuration for increasing production of gas bubbles.

In a third embodiment, the stack is described as above, but without the cooling plates 50. The embodiment includes a manifold (not shown) for carrying a liquid across the outlets 40 of the sparger. The manifold preferably directs the fluid to flow across the outlet side of the sparger in the direction of the shorter dimension. The manifold can be partitioned to create separate channels, segregating the flow and further preventing the merging of bubbles carried in the liquid phase.

In an annular embodiment, the apparatus comprises an array of plates, where each plate has an annular configuration. As with the first embodiment, the array is of pairs of plates stacked in an alternating sequence. FIGS. 6A and B show a top view and cross-sectional view of the first annular plate 70. As shown in FIGS. 6A and B the first plate 70 of the pair of plates has a top side, a bottom side, an inner edge, and an outer edge. The plate 70 has a main channel 72 having at least one inlet 74 located on the outer edge of the plate 70, and a plurality of outlets 76 on the top side of the plate 70. The first plate 70 further has a plurality of smaller channels 78 on the same side of the plate 70 as the main channel 72, where each smaller channel 78 has an inlet in fluid communication with a corresponding outlet 76 from the main channel 72. The smaller channels 78 each have an outlet 80 that extends through the plate 70 to the bottom of the plate, creating an array of slits on the bottom of the plate 70. In this embodiment, the smaller channels 78 do not extend to the inner edge of the plate 70.

The annular embodiment further comprises a second plate 90 of a pair of plates, as shown in FIGS. 7A and B, and having a top side, a bottom side, an inner edge, and an outer edge. FIGS. 7A and B show a top view and cross-sectional view of the second annular plate 90. The plate 90 has a main channel 92 having an inlet 94, and a plurality of outlets 96 on one side of the plate 90. The second plate 90 further has a plurality of smaller channels 98 on the same side of the plate 90 as the main channel 92, where each smaller channel 98 has an inlet in fluid communication with a corresponding outlet 96 from the main channel 92. The smaller channels 98 each have an outlet 100 which opens at the inner edge of the second plate 90. As with the main channel 92, the smaller channels 98 do not extend through the plate 90 to the opposing side. A section of the smaller channels 98 of the second plate 90 provides a region where the gases from channels 78 and 98 mix prior to exiting the outlets 100.

As with the first embodiment, the plates are etched, stamped, milled, pressed, or otherwise produced by methods known in the art.

In this embodiment, the stack of plates create a pipe-like structure, where a liquid phase flows down the central region of the structure. The mixed gases exiting the outlets 100 are dispersed in the liquid phase and carried down the length of the structure. When pairs of plates 70, 90 are stacked and affixed together, the resulting embodiment will be a toroidal structure, forming a sparger having an external surface and an internal surface. On the outside there will be the inlets for the main channels 72, 92 for the plates, and on the inside there will be an array of small openings that are the outlets 100 for the smaller channels 98 of the second plates. A liquid flows down the channel formed by the internal surface of the stack of plates. As the liquid flows over the smaller channel outlets 100, a cloud of gas bubbles is entrained in the liquid providing an improved mass transfer for dissolving the gas mixture in the liquid.

A schematic showing the mixing of two gases with the present invention is shown in FIG. 8. A first gas flows into the first plate main channel 72 depicted by arrow 73. The first gas then flows into the first plate secondary channels 78 depicted by arrows 75. The first gas exits the bottom of the first plate through exits 80 as seen in FIG. 6B, and flows into the second plate secondary channels 98 depicted by arrows 77. A second gas flows into the second plate main channel 92 depicted by arrow 93. The second gas then flows into the secondary channels 98 depicted by arrows 95. The second gas mixes with the first gas flowing 77 from the first plate 70 in the second plate secondary channels 98. The mixture of the first gas and second gas exit the second plate secondary channels 98 depicted by arrows 97.

In another embodiment, the invention further includes an annular cooling plate 110, as shown in FIGS. 9A and B, which also provides a conduit for a liquid phase to carry the gas mixture exiting the outlets 100 as bubbles. FIGS. 9A and B show a top view and cross-sectional view of the cooling plate 110. The cooling plate 110 comprises a main channel 112 for the liquid. The main channel 112 includes at least one inlet 114, and a plurality of outlets 116. The cooling plate 110 further includes a plurality of smaller distribution channels 118 where each smaller channel 118 has an inlet corresponding to a main channel outlet 116, and an outlet 119. The cooling plate 110 has an inner edge and an outer edge, and the outlets 119 are positioned around the inner edge to distribute the liquid exiting the smaller channels 118.

This embodiment, when the plates 70, 90, 110, are stacked in an alternating sequence creates a pipe-like structure (not shown) having an inner conduit, along which are included alternating tiers of openings for the gas mixture and the liquid.

In another embodiment, the apparatus further includes a reactor bed. The apparatus includes a conduit for carrying a liquid feed over the gas sparger, where the liquid is in fluid communication with the outlets of the sparger. The liquid, after passing over the sparger outlets is a liquid carrying a gas bubble cloud. The reactor bed (not shown) has an inlet in fluid communication with the gas bubble cloud bearing liquid, and an outlet.

Figure 10:
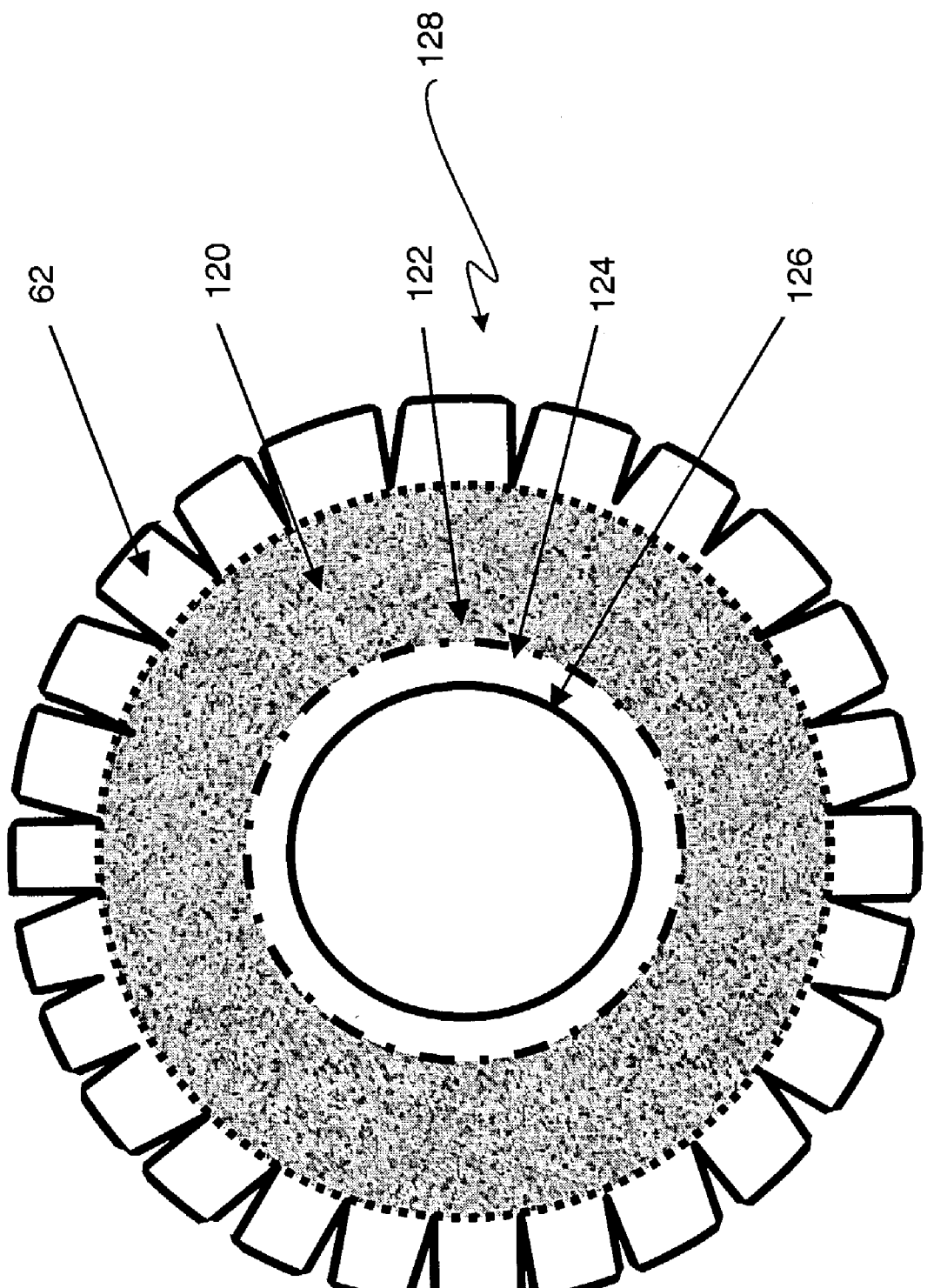
FIG. 10 is a design of a radial reactor using the sparger design of FIG. 5.

In one embodiment of the sparger-reactor combination of the present invention, a plurality of the spargers 62, as shown in FIG. 5, is arrayed around a toroidal shaped reactor core 120, as shown in FIG. 10, creating a sparger-reactor unit 128. The array of channel outlets 40 of the spargers 62 are small enough in the present embodiment to act as an effective screen holding the catalyst in place. For spargers 62 with larger channel outlets 40, an optional screen (not shown) is used. The sparger-reactor unit 128 includes an inner screen 122 over the inner surface of the reactor core 120. The screen 122 separates the reactor core 120 from a collection space 124, where the collection space 124 is the space defined by the inner screen 122 and an inner wall 126 in the reactor. The screen 122 also provides a means for holding the particles of the reactor in place. The inner wall 126 is provided by a tube inside the reactor and sized to minimize pressure drop while collecting the liquid containing hydrogen peroxide. Optionally, the tube is omitted, and the inner space 124 is the space defined by the inner screen 122. This reactor arrangement provides several advantages. A radial reactor overcomes pressure drop limitations associated with a trickle bed reactor with small particle sizes. The small particle sizes for a trickle bed reactor are necessary to prevent large gas spaces for hydrogen-oxygen mixtures. A radial reactor design allows for easier replacement of the reactor bed 120. The sparger 62 design distributes the liquid carrying small gas bubbles rapidly into the reactor bed 120 without allowing the gas to agglomerate into larger gas bubbles. And, the sparger-reactor unit 128 is easily fabricated and assembled as modules for convenient scale-up to cover a broad range of flow rates.

The reactor bed comprises a catalyst for the formation of hydrogen peroxide from hydrogen and oxygen. The catalyst comprises at least one catalytic metal component deposited on a support, wherein the catalytic metal component is selected from the group consisting of platinum (Pt), palladium (Pd), ruthenium (Ru), rhodium (Rh), iridium (Ir), osmium (Os), and gold (Au). Preferably, the catalyst comprises a mixture of two metals. In one embodiment, the catalyst comprises at least one metal selected from above on a support. The support material is any inert material on which the catalyst can be deposited, and includes but is not limited to, silica, alumina, titania, zirconia, carbon, silicon carbide, silica-alumina, diatomaceous earth, clay, and molecular sieves. Preferably, the support is a porous material for providing greater surface area for the reaction to proceed.

The sparger with reactor, optionally, can be made as a unit, wherein a plurality of the units are used to generate hydrogen peroxide.

Figure 11:
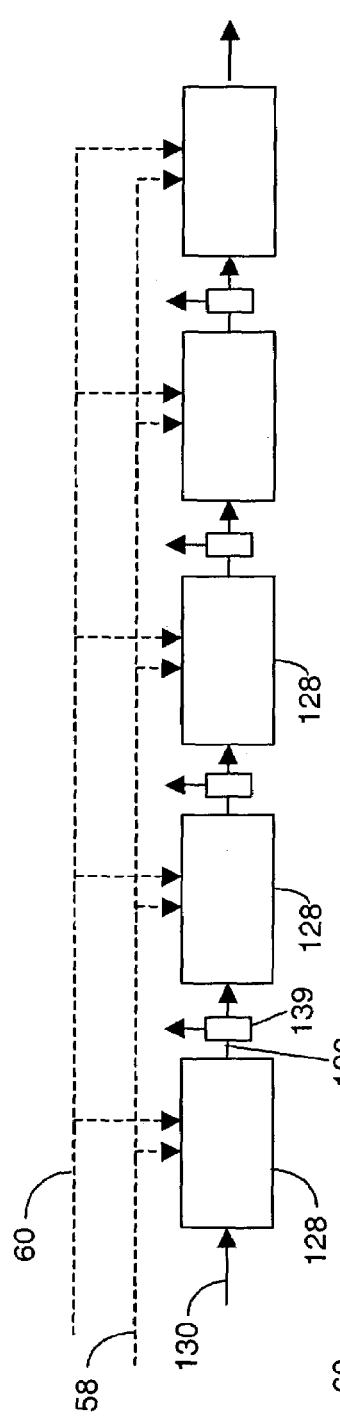
FIG. 11 is a schematic of the stages of sparger and reactor for hydrogen peroxide generation.

In one embodiment of the hydrogen peroxide reactor, the apparatus contains at least two sparger-reactor stages, as shown in FIG. 11. A sparger-reactor unit 128 has a liquid supply 130, a hydrogen supply 58, and an oxygen supply 60. The hydrogen and oxygen go to the sparger within the unit 128 and are dispersed in the liquid and flow over the reactor bed within the unit 128. The sparger-reactor unit 128 has a product outlet 132 which contains a liquid stream carrying residual bubbles of gas. The product stream enters a gas-liquid separation unit 134, where any residual gas is collected and separated from the liquid. The liquid stream containing some hydrogen peroxide is further fed to a subsequent sparger-reactor unit 128. Any residual gas is vented, or directed to other parts of the plant, and can be used for combustion or other purposes. Optionally, the gas-liquid separation unit 134 includes a gas inlet in fluid communication with the gas collection zone. This allows for the addition of a gas to dilute the hydrogen-oxygen mixture to be vented. The dilution gas may be an inert gas such as nitrogen. The advantage of using stages allows for producing a high concentration of hydrogen peroxide in the liquid, without requiring a high ratio of gas to liquid in any of the reactors. This facilitates the generation of the gas as a bubble cloud in the liquid while preventing the formation of large gas volumes by limiting the agglomeration of the gas bubbles. The flow of oxygen to hydrogen to each reactor stage preferably has a ratio by volume of about 1, or the stoichiometric ratio.

Figure 12:
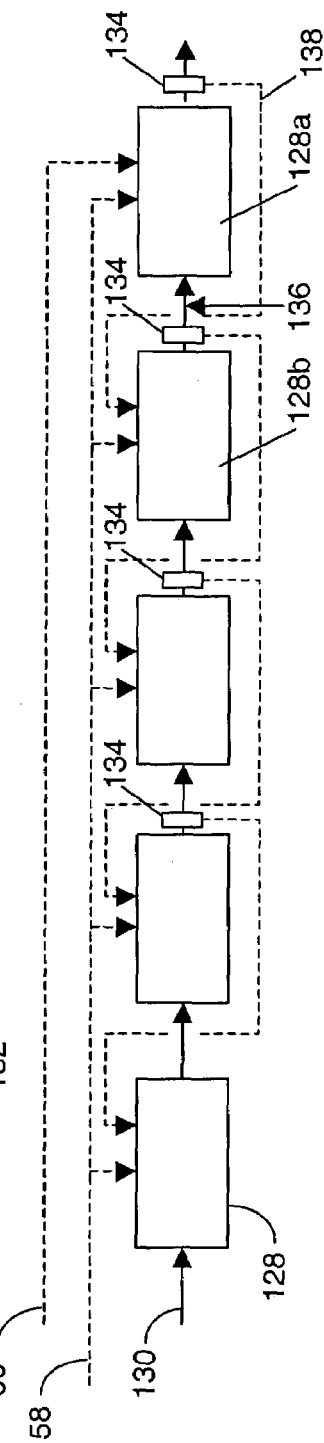
FIG. 12 is a schematic of the stages of a hydrogen peroxide reactor using counter current flow.

In an alternate embodiment of the hydrogen peroxide reactor, the apparatus contains at least two sparger-reactor stages in a counter-current flow reactor design, as shown in FIG. 12. In the counter-current flow design, the last reactor unit 128a has a liquid feedstream 136 from a prior reactor unit/gas-liquid separator, and hydrogen 58 and oxygen 60 are fed to the sparger with a high oxygen to hydrogen ratio by volume. The product stream is separated in a gas-liquid separator 134, where the oxygen rich gas is directed to the sparger for the prior reactor 128b. The prior reactor 128b in turn receives a liquid feedstream from an earlier reactor 128c, hydrogen 58 and oxygen from an oxygen rich gas stream 138 from a subsequent reactor 128a. This process is repeated back to a first reactor 128. The counter-current flow design allows for a high oxygen to hydrogen ratio by volume in the gas phase at the last reactor stage. Operating at excess oxygen concentration at the last stage gives enhanced selectivity for hydrogen peroxide. With this process the oxygen to hydrogen ratio by volume in the gas increases as the process progresses from the one reactor to a subsequent reactor. It is desirable to have the oxygen to hydrogen volume ratio for the last reactor at between about 2 and about 10, with the oxygen to hydrogen volume ratio for the first reactor at about 1. This provides for a high overall oxygen conversion while maintaining the benefits of a low gas to liquid flow ratio by volume in each reactor stage and high oxygen concentration in the later stages.

In another embodiment (not shown) of the reactor, the reactor has a simplified version of the counter current design. This is termed the pseudo-counter current reactor design. The flow scheme is the same as shown and described above in FIG. 11, but the ratio of oxygen to hydrogen volumetric flows vary from about 1 to about 20, with the ratio increasing from about 1 at the first reactor to a ratio between 1 and 20 at the last stage. Preferably, the final ratio is between about 2 and about 4.

Figure 13:
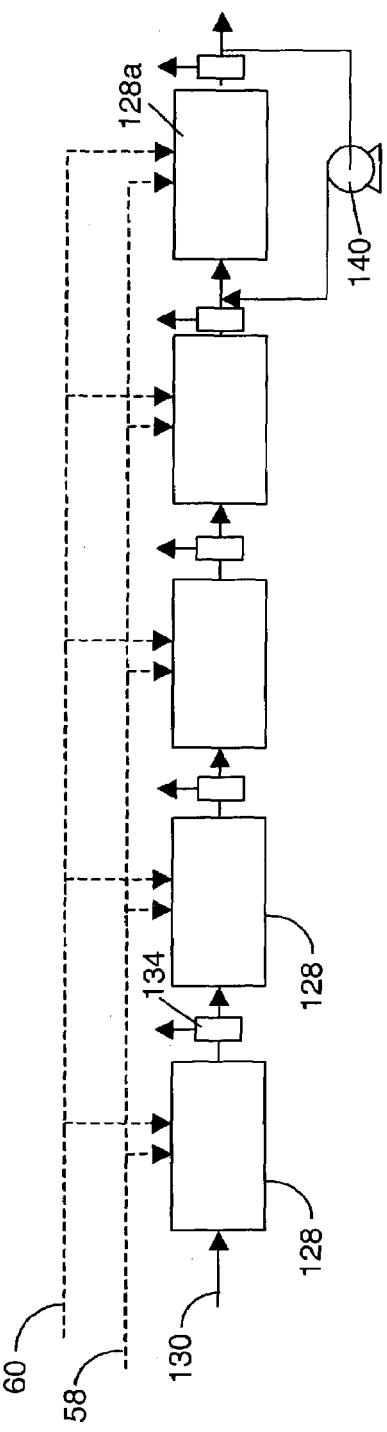
FIG. 13 is a schematic of a hybird design for the hydrogen peroxide reactor.

In another alternate embodiment, the reactor has a flow scheme as shown in FIG. 13. The flow is similar to that as described above for FIG. 11, except with the addition of a recycle stream for the liquid phase. A portion of the liquid product stream from the last reactor 128a is recycled through a pump 140 to the inlet of the last reactor stage 128a. The use of the recycle stream should only be used for situations where the oxygen to hydrogen volumetric ratios are greater than 2 for the last reactor 128a. As a variation on this embodiment, the recycle stream can be directed to an inlet of a reactor upstream of the last reactor 128a, but it should be one of the reactors close to the last reactor 128a.

One embodiment (not shown) also allows for the movement of catalyst through the reactor stages. The selectivity of the catalyst for hydrogen peroxide production has been shown to increase as the catalyst becomes deactivated. Since it is desirable to have a higher selectivity in the later reactors, a reactor design that moves the catalyst from a reactor unit 128 to a subsequent reactor unit 128 is advantageous, with fresh catalyst added to the first reactor unit 128. One method of designing this reactor is to stack the reactor units 128, such that the first reactor unit 128 is on top, with the successive stages stacked below. The catalyst would then be added to the top unit, and catalyst within the reactor units would migrate downward to successive units, with catalyst withdrawn and separated from the last reactor unit.

The present embodiments allow for the use of low ratio of gas to liquid volume flowrates, which enables the formation of a stable bubble cloud within the liquid phase, and for the production of high concentrations of hydrogen peroxide. In addition, the use of reactor units in series permits greater control over the operating conditions and to improve the selectivity for hydrogen peroxide production.

While the invention has been described with what are presently considered the preferred embodiments, it is to be understood that the invention is not limited to the disclosed embodiments, but is intended to cover various modifications and equivalent arrangements included within the scope of the appended claims.

What is claimed is:

1. An apparatus for mixing two gases comprising:
   at least one first plate, wherein the first plate defines a first gas main channel having an inlet and a plurality of outlets, and a plurality of first gas secondary channels wherein each first gas secondary channel has an inlet in fluid communication with a corresponding first gas main channel outlet, and a first gas secondary channel outlet;
   at least one second plate, wherein the second plate defines a second gas main channel having an inlet and a plurality of outlets, and a plurality of second gas secondary channels wherein each second gas secondary channel has an inlet in fluid communication with a corresponding second gas main channel outlet, and a second gas secondary channel outlet;
   wherein each first gas secondary channel outlet is in fluid communication with a second gas secondary channel at a position upstream of the second gas secondary channel outlet, and where the first and second plates are stacked in an alternating sequence and held together to form a gas sparger having a first gas inlet, a second gas inlet, and a mixed gas outlet;
   a sparger liquid feed conduit having an inlet for a liquid feed, which is in fluid communication with the gas sparger second gas secondary channel outlet for generating a cloud of gas bubbles in the liquid, and an outlet for the liquid carrying a gas bubble cloud; and
   a reactor bed having an inlet in fluid communication with the liquid feed conduit outlet, and an outlet forming a reactor-sparger unit comprising a gas sparger for generating gas bubbles in a liquid and a reactor over which the gas bubble bearing liquid flows.

2. The apparatus of claim 1 wherein the first and second gas secondary channels are arranged in a substantially parallel configuration.

3. The apparatus of claim 1 wherein the first and second gas secondary channels are arranged in a substantially radial configuration.

4. The apparatus of claim 1 further comprising a manifold having a plurality of inlets in fluid communication with the secondary channel outlets, at least one inlet for admitting a third component, and at least one outlet for the egress of a mixture of the first gas, the second gas, and the third component.

5. The apparatus of claim 4 wherein the manifold comprises a plate defining a plurality of channels, wherein each channel is in fluid communication with at least one of the first gas secondary channel outlets and at least one of the second gas secondary channel outlets, has at least one inlet for the third component, and at least one outlet for the egress of a mixture of the first gas, the second gas, and the third component.

6. The apparatus of claim 1 further comprising a cooling plate, wherein the cooling plate comprises a plurality of channels with each channel having an inlet and an outlet, and the cooling channel outlets are in fluid communication with the second gas secondary channel outlets.

7. The apparatus of claim 2 further characterized in that the outlet of the first gas secondary channel terminates in the second gas secondary channel, wherein the section of the second gas secondary channel downstream of the outlet of the first gas secondary channel comprises a mixing section having an effective diameter of no greater than 300 micrometers.

8. The apparatus of claim 7 wherein the mixing section has an effective diameter of no greater than 200 micrometers.

9. The apparatus of claim 1 wherein the apparatus comprises a plurality of reactor-sparger units.

10. The apparatus of claim 1 further comprising a recycle conduit having an inlet in fluid communication with the reactor bed outlet and an outlet in fluid communication with the sparger liquid feed conduit.

11. The apparatus of claim 1 wherein the reactor bed comprises a catalyst, the catalyst comprising at least one catalytic metal component deposited on a support, wherein the catalytic metal component is selected from the group consisting of platinum (Pt), palladium (Pd), ruthenium (Ru), rhodium (Rh), iridium (Ir), osmium (Os), gold (Au), and mixtures thereof.

12. The apparatus of claim 11 wherein the support comprises a material selected from the group consisting of silica, alumina, titania, zirconia, carbon, silicon carbide, silica-alumina, diatomaceous earth, clay, molecular sieves, and mixtures thereof.

13. An apparatus for mixing two gases comprising:
a plurality of reactor-sparger units, where each reactor-sparger unit comprises:
at least one first plate, wherein the first plate defines a first gas main channel having an inlet and a plurality of outlets, and a plurality of first gas secondary channels wherein each first gas secondary channel has an inlet in fluid communication with a corresponding first gas main channel outlet, and a first gas secondary channel outlet;
at least one second plate, wherein the second plate defines a second gas main channel having an inlet and a plurality of outlets, and a plurality of second gas secondary channels wherein each second gas secondary channel has an inlet in fluid communication with a corresponding second gas main channel outlet, and a second gas secondary channel outlet, wherein each first gas secondary channel outlet is in fluid communication with a second gas secondary channel at a position upstream of the second gas secondary channel outlet, and where the first and second plates are stacked in an alternating sequence and held together to form a gas sparger having a first gas inlet, a second gas inlet, and a mixed gas outlet;
a liquid feed conduit having an inlet for a liquid feed, which is in fluid communication with the gas sparger second gas secondary channel outlet for generating a cloud of gas bubbles in the liquid, and an outlet for the liquid carrying a gas bubble cloud; and
a reactor bed having an inlet in fluid communication with the liquid feed conduit outlet, and an outlet forming a reactor-sparger unit comprising a gas sparger for generating gas bubbles in a liquid and a reactor over which the gas bubble bearing liquid flows; and
a gas-liquid separation unit having an inlet, a gas outlet, and a liquid outlet, and disposed between neighboring reactor-sparger units, wherein a preceding reactor-sparger unit outlet is in fluid communication with the separation unit inlet, and the liquid outlet is in fluid communication with a succeeding reactor-sparger unit liquid inlet.

14. The apparatus of claim 13 wherein the separation unit gas outlet is in fluid communication with at least one of the first gas inlet and second gas inlet of the sparger unit.

15. The apparatus of claim 13 wherein the gas-liquid separation unit comprises a separation zone in fluid communication with the inlet, a gas collection zone in fluid communication with the gas outlet, a liquid collection zone in fluid communication with the liquid outlet, and an inert gas inlet in fluid communication with the gas collection zone.

16. An apparatus for mixing two gases comprising:
at least one first plate, wherein the first plate defines a first gas main channel having an inlet and a plurality of outlets, and a plurality of first gas secondary channels wherein each first gas secondary channel has an inlet in fluid communication with a corresponding first gas main channel outlet, and a first gas secondary channel outlet;
at least one second plate, wherein the second plate defines a second gas main channel having an inlet and a plurality of outlets, and a plurality of second gas secondary channels wherein each second gas secondary channel has an inlet in fluid communication with a corresponding second gas main channel outlet, and a second gas secondary channel outlet;
wherein each first gas secondary channel outlet is in fluid communication with a second gas secondary channel at a position upstream of the second gas secondary channel outlet, and where the first and second plates are stacked in an alternating sequence and held together to form a gas sparger having a first gas inlet, a second gas inlet, and a mixed gas outlet; and
a reactor bed, wherein the reactor bed comprises:
an annular reactor bed having a generally cylindrical shape with an inner surface and an outer surface;
a catalyst retention screen; and
a product conduit;
wherein the sparger is disposed on one of the inner or outer surfaces, the catalyst retention screen is disposed on the other of the surfaces, and the product conduit is in fluid communication with the surface bounded by the retention screen.

17. The apparatus of claim 16 wherein the reactor bed comprises a catalyst, the catalyst comprising at least one catalytic metal component deposited on a support, wherein the catalytic metal component is selected from the group consisting of platinum (Pt), palladium (Pd), ruthenium (Ru), rhodium (Rh), iridium (Ir), osmium (Os), gold (Au), and mixtures thereof.

18. The apparatus of claim 17 wherein the support comprises a material selected from the group consisting of silica, alumina, titania, zirconia, carbon, silicon carbide, silica-alumina, diatomaceous earth, clay, molecular sieves, and mixtures thereof.

19. An apparatus for mixing two gases comprising:
a gas sparger comprising:
at least one first plate, wherein the first plate defines a first gas main channel having an inlet and a plurality of outlets, and a plurality of first gas secondary channels wherein each first gas secondary channel has an inlet in fluid communication with a corresponding first gas main channel outlet, and a first gas secondary channel outlet; and
at least one second plate, wherein the second plate defines a second gas main channel having an inlet and a plurality of outlets, and a plurality of second gas secondary channels wherein each second gas secondary channel has an inlet in fluid communication with a corresponding second gas main channel outlet, and a second gas secondary channel outlet;
wherein each first gas secondary channel outlet is in fluid communication with a second gas secondary channel at a position upstream of the second gas secondary channel outlet, and where the first and second plates are stacked in an alternating sequence and held together to form a gas sparger having a first gas inlet, a second gas inlet, and a mixed gas outlet;
a reactor comprising a plurality of reactor beds wherein each reactor bed comprises:
an annular reactor bed having a generally cylindrical shape with an inner surface and an outer surface, wherein the reactor bed comprises a catalyst, the catalyst comprising at least one catalytic metal component deposited on a support, wherein the catalytic metal component is selected from the group consisting of platinum (Pt), palladium (Pd), ruthenium (Ru), rhodium (Rh), iridium (Ir), osmium (Os), gold (Au), and mixtures thereof, and wherein the support comprises a material selected from the group consisting of silica, alumina, titania, zirconia, carbon, silicon carbide, silica-alumina, diatomaceous earth, clay, molecular sieves, and mixtures thereof;

a catalyst retention screen; and a product conduit;

wherein the sparger is disposed on one of the inner or outer surfaces, the catalyst retention screen is disposed on the other of the surfaces, and the product conduit is in fluid communication with the surface bounded by the retention screen, and wherein the reactor bed comprises a plurality of stages and the catalyst flows through the reactor bed from one stage to a subsequent stage.

20. The apparatus of claim 19 wherein the catalyst in the last stage is partially deactivated.

* * * * *